Sept. 20, 1966 E. SCHÜLLER 3,273,815

TAPE RECORDER

Filed Feb. 20, 1964 2 Sheets-Sheet 1

INVENTOR
Eduard Schüller

BY Spencer & Kaye

ATTORNEYS

Sept. 20, 1966 E. SCHÜLLER 3,273,815

TAPE RECORDER

Filed Feb. 20, 1964 2 Sheets-Sheet 2

INVENTOR
Eduard Schüller

BY Spencer & Kaye

ATTORNEYS

United States Patent Office 3,273,815
Patented Sept. 20, 1966

3,273,815
TAPE RECORDER

Eduard Schüller, Wedel, Holstein, Germany, assignor to Telefunken Patentverwertungsgesellschaft m.b.H., Ulm (Danube), Germany Filed Feb. 20, 1964, Ser. No. 346,338
Claims priority, application Germany, Feb. 20, 1963, T 23,501
17 Claims. (Cl. 242—55.12)

The present invention relates to tape recorders, particularly to a tape recorder which is provided with an opening at the front through which the record carrier, i.e., the tape, can be inserted and removed.

Magnetic tape recorders are conventionally provided with a cover which closes off the tape recorder from the top, the reels of magnetic tape being placeable on the reel carriers, hereinafter referred to as turntables, from the top. Also, the control organs are generally so arranged as to be operable from the top.

Such an arrangement is awkward if the tape recorder is to be mounted in a drawer or compartment of a console, cabinet, or other piece of furniture, the reason for this being that the height of the drawer or compartment, unless it is of the pullout type, is usually such as to make it impossible to open the cover, and if the cover can be removed, the fact that the tape recorder has all of its control organs at the top makes the unit cumbersome and difficult to operate. Consequently, in order to protect the tape recorder against dust and dirt, it has to be taken out of the cabinet before and after each use, in order to allow the cover to be removed and replaced.

There exist tape recorders using cartridge-type tapes, which recorders have an opening at the front through which the cartridge can be inserted. The drawback of such recorders is that they can be used only in conjunction with the particular cartridge for which they are designed, so that ordinary tapes cannot be used which, naturally, makes it impossible for the tape recorder to be used with any one of a plurality of different types of tape arrangements.

It is, therefore, an object of the present invention to provide a tape recorder which overcomes the aforementioned disadvantages, and, according to the present invention, this is accomplished by providing a tape recorder having an opening at the front with guiding means which are adapted to the diameter of the magnetic tape reels, through which guide means the reels can be inserted to lie above the turntables, there being suitable stops or abutments for this. Furthermore, a flap which covers the opening is provided with means which, when the flap is closed, brings the reels into engagement with the spindles of the turntables.

By virtue of the above arrangement, individual reels can be introduced through the front opening of the tape recorders just as easily as in the case of cartridges. The tape leader can be threaded onto the take-up reel prior to the introduction of the reels, or the threading can take place automatically by providing one or more levers which are spring pressed to lie between the flanges of the take-up reel, these levers being so mounted and arranged that the tape leader threaded between the reel flanges is deflected tangentially against the periphery of the hub of the reel. Such a self-threading arrangement is disclosed in copending application Serial Number 320,128, filed Oct. 30, 1963, of Eduard Schüller and Fritz Radensleben, and assigned to the same assignee as the instant application.

According to a further feature of the present invention, the flap is used for turning the tape recorder on, and for switching it between "normal forward," i.e., record and playback, "fast forward," and "fast rewind" positions, so that the operation of the tape recorder is greatly simplified because, except for a selector switch which is to be actuated only before recording, all of the operations of the tape recorder can be controlled by the flap.

Additional objects and advantages of the present invention will become apparent upon consideration of the following description when taken in conjunction with the accompanying drawings in which.

Figure 1:
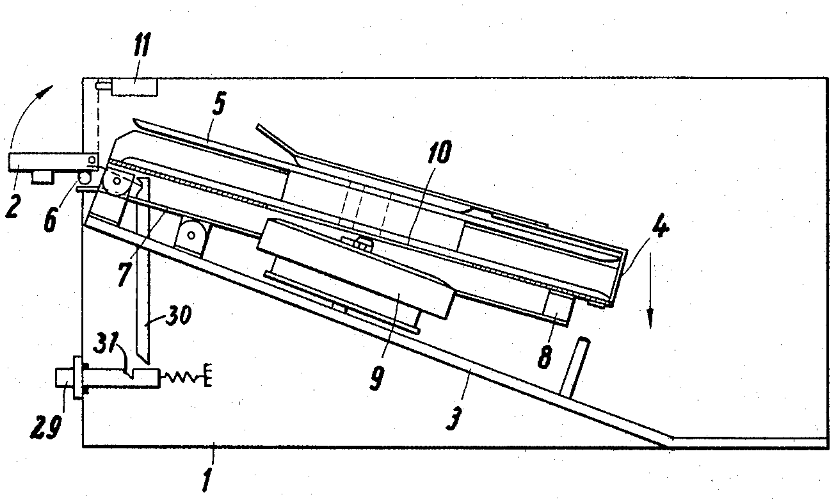
FIGURE 1 is a side elevation, partly in section, of a tape recorder according to the present invention, FIGURE 1 showing the guiding means through which the reels are inserted.

Referring now to the drawings, the same show a housing 1 which is provided at the front (the left-hand side, as viewed in FIGURE 1) with a flap 2 which extends over the entire length of the housing and which can be swung out forwardly into the position shown in FIGURE 1. The chassis or deck plate 3, which carries the various operating components, is inclined downwardly from the front toward the bottom of the housing so that the guiding means 4 for the magnetic tape reels 5, which guiding means 4 are hingedly connected to the plate 3, also are inclined, thereby to facilitate the insertion of the reels. The guiding means 4 are constituted by guides in the form of flat sheets having right-angled flanges at their sides. The guide sheets are pivotally connected to the chassis plate 3 at a point near the flap 2. The latter is provided with a camming element 6 which, when the flap 2 is opened, coacts with one end of each of a plurality of levers 7 which themselves are pivotally mounted on the plate 3, so that the free ends 8 of these levers are raised and engage the rearward ends of the guides 4, thereby to raise the same. Conversely, when the flap 2 is closed, the guides 4 are lowered until each of the turntables 9 projects through a respective opening 10 in the bottom of the guides 4 so that the flat supporting surfaces of the guide elements 4, on which the reels rest, come to lie below the uppermost level of the turntables, namely, the top of the spindles which project through the openings 10. Thus, the hubs of the reels come into engagement with the spindles of the turntables.

The upwardly flanged parts of the guides 4 serve as positioning means arranged so as precisely to center the end position of the reels with respect to the turntable spindles. These spindles can, as is conventional, be splined so that as soon as the reel drive is switched on, the turntable spindles enter corresponding grooves of the reels. This switching on of the reel drive is likewise effected by closing the flap 2. To this end, the flap 2 is mounted not only for pivotal movement but also for longitudinal movement out of a central rest position into right and left-hand end positions. These end positions correspond to switching over for "fast forward" and "fast rewind."

Figure 2:
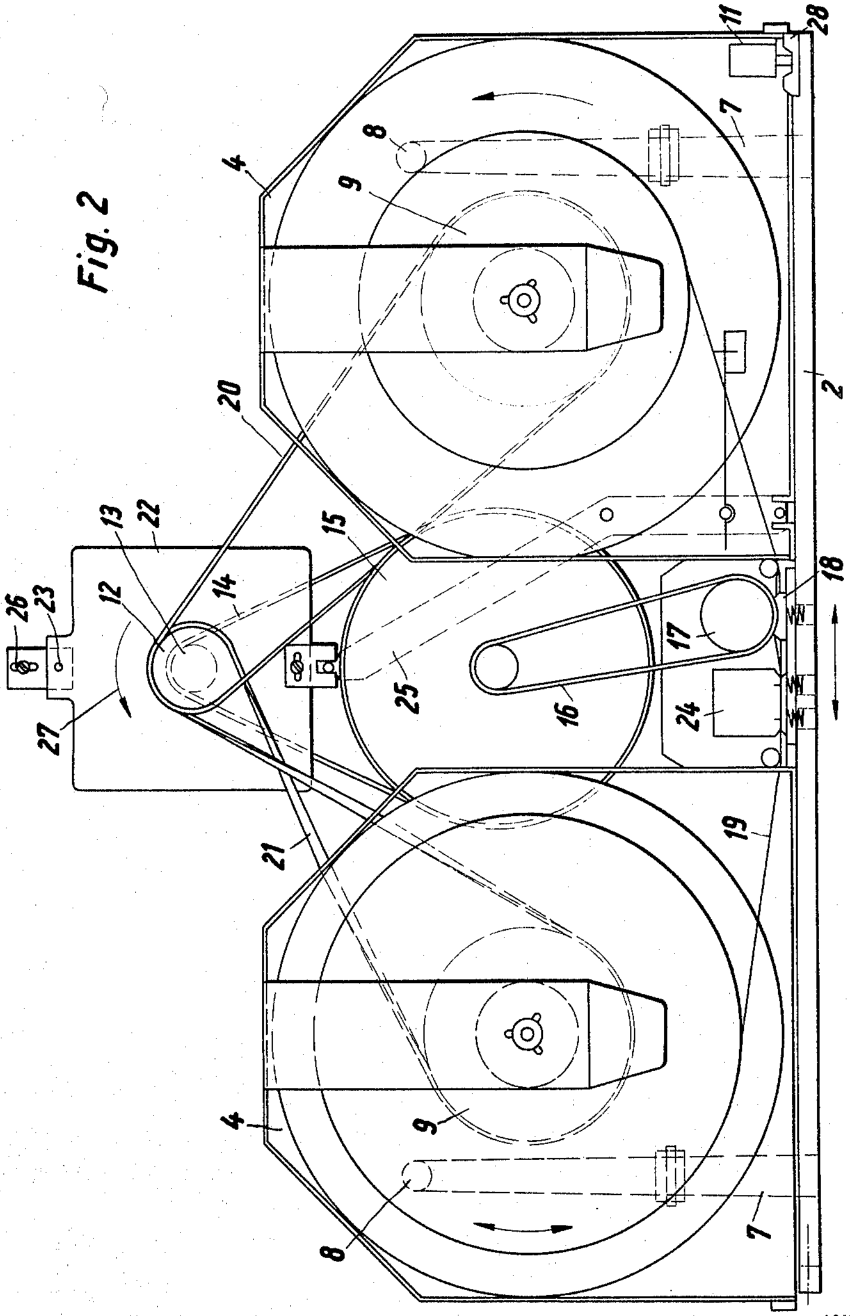
FIGURE 2 is a plan view of the structure shown in FIGURE 1 and also illustrates the drive for the turntables.

The control function of flap 2 is best shown in FIGURE 2. When the flap 2 is closed, the same engages an "on"-"off" switch 11 which is biased to its "off" position, thereby to turn the switch to its "on" position to energize a motor (not shown) for driving a shaft 12 in the direction of arrow 27. One axial stepped section 13 of the shaft 12 is power-transmittingly connected, via a transmission belt 14, with a flywheel 15, the latter driving, via a further transmission belt 16, the capstan 17. This capstan, as well as a transducer head 24, are, as illustrated, arranged along the frontal opening of the housing and between the two turntables, in consequence of which a tape which is threaded on two reels inserted through the opening is made to lie against the transducer head and the capstan.

The flap 2 carries two resiliently mounted counter pressure devices, such as a shoe 18 which presses the magnetic tape against the capstan, and a further shoe which presses the tape against the transducer head 24, so that during normal operation, the tape will be held firmly against the driving capstan and the transducer head.

The shaft 12 is connected, via further transmission belts 20 and 21, with the two turntables 9. The belt 21 is crossed so that the two turntables are given rotary moments in opposite direction. The shaft 12 is mounted on a carrier 22 which is pivotable about an axle 23. In the center position of the carrier, which is the position illustrated in FIGURE 2 and corresponds to the "normal forward" operation during recording or playing back, the belts 20 and 21 are but weakly tensioned so that the right-hand reel, constituting the take-up reel, will hold taut the tape that is being advanced by the actual tape transport device 17, 18, and the left-hand reel, constituting the supply or pay-off reel, has exerted on it a braking moment which is sufficient to hold taut that reach of the tape which extends between the pay-off reel and the tape transport device. The tension on the belts can be regulated by displacing the carrier 22 in the region of an elongated slot 26.

The flap 2 is, as mentioned above, displaceable in the direction of its length, i.e., rightwardly or leftwardly as viewed in FIGURE 2. The flap is connected to the carrier 22 via a pivotally mounted two-armed lever 25, one end of which is connected to the flap 2 and the other end of which is connected to the carrier 22, so that, by longitudinally displacing the flap 2, the carrier can be pivoted in clockwise or counterclockwise direction. When the flap 2 is displaced to the right, the carrier 22 is pivoted clockwise about axle 23, thereby tensioning the belt 20 to establish a substantially slippage-free connection between the shaft 12 and the turntable carrying the take-up reel, and slackening the belt 21. This position of the flap 2 corresponds to the "fast forward" position of the tape recorder, during which the braking force exerted on the turntable carrying the pay-off is reduced, due to the slackening of the belt 21. This reduced braking is quite in order due to the fact that the fast forward winding will require a smaller braking force to be exerted on the pay-off reel.

If the flap is displaced from its center position to its left end position, the lever 25 pivots the carrier in counterclockwise direction about axle 23, thereby tightening belt 21 to establish a substantially slippage-free connection between the drive shaft 12 and the left-hand turntable 9, while slackening the belt 20 so that only a braking force is exerted on the right-hand turntable. In this position, the tape is rewound onto the pay-off reel.

In order to allow the tape to move freely past the capstan during the fast forward or rewinding operation, the flap 2 is provided with a cam 28 so that, when the flap 2 is in either of its end positions corresponding to "fast forward" or "fast rewind," the flap is moved forwardly so that the two shoes are lifted off the capstan 17 and the transducer head 24, the switch 11, however, still being held in its "on" position.

It will be appreciated that the operation of the tape recorder is greatly simplified inasmuch as virtually all of the necessary control movements can be effected by manipulating the flap 2. All that is required, for purposes of recording, is a separate selector switch, which may be so coupled with the flap 2 that, when the flap 2 is opened, the switch is sprung back, and held in place when the flap is closed, i.e. a selector switch which can be actuated when the flap is open but is held in actuated position only when the flap is closed.

As schematically illustrated in FIGURE 1 this may be achieved by means of a rod 30 which is lifted when the flap 2 is open and then cannot interlock with the selector switch 29, while with the flap 2 closed the rod is lowered and after actuation of the selector switch will fall with its lower end portion into a recess 31 provided within the push rod of the selector switch thus keeping the push rod pressed.

It will be understood that the above description of the present invention is susceptible to various modifications, changes and adaptations, and the same are intended to be comprehended within the meaning and range of equivalents of the appended claims.

What is claimed is:

1. In a tape recorder, the combination which comprises:

(a) a housing having an opening at the front through which tape reels can be inserted and removed;
(b) turntable means in said housing;
(c) guide means arranged in said housing and being in alignment with said opening to receive tape reels inserted therethrough;
(d) positioning means associated with said guide means for making the end position of a reel inserted through said opening onto said guide means a position in which such reel is in alignment with said turntable means;
(e) closure means for closing said opening; and
(f) moving means operative by the closing movement of said closure means for bringing a reel held by said guide means in said end position and said turntable means into engagement with each other.

2. The combination defined in claim 1 wherein said guide means are mounted for movement between a raised position in which a reel, in said end position, is out of engagement with said turntable means and a lowered position wherein the reel, in said end position, is in engagement with said turntable means, and wherein said moving means interconnect said closure means and said guide means for moving said guide means to its raised position upon opening of said closure means and for moving said guide means to its lowered position upon closing of said closure means.

3. The combination defined in claim 2 wherein said guide means comprise a flat guide element having a supporting surface on which rests a reel to be used in the tape recorder, and wherein said supporting surface of said guide element, in said lowered position, lies below the uppermost level of said turntable means.

4. The combination defined in claim 3 wherein said turntable means comprises an upwardly extending spindle whose top constitutes said uppermost level of said turntable means, said spindle, in said lowered position of said guide element, engaging the hub of the reel.

5. The combination defined in claim 4 wherein said guide element is a sheet member provided with an opening through which said spindle may extend, thereby to engage the hub of the reel, when said sheet member is in said lowered position.

6. The combination defined in claim 5 wherein said positioning means are constituted by upstanding flanges of said sheet member.

7. The combination defined in claim 2 wherein said moving means comprise lever means pivotally mounted in said housing, said lever means being cammed by said closure means and coacting with said guide means to move the same between said positions thereof.

8. The combination defined in claim 1 wherein said guide means are inclined downwardly from the front of said housing toward the bottom thereof.

9. The combination defined in claim 1 wherein said turntable means include two separate spaced-apart turntables for rotating a take-up reel and a pay-off reel, respectively, and wherein said guide means are arranged to receive two tape reels each being positioned in an end position, by said positioning means, to be in alignment with a respective one of said turntables.

10. The combination defined in claim 9 wherein the tape recorder further comprises a transducer head and a tape driving capstan, said transducer head and said capstan being arranged along said frontal opening of said housing and between said turntables, in consequence of which a tape which is threaded onto two reels inserted through said opening and to be placed into engagement with said turntables is made to lie against said transducer head and said capstan; said closure means carrying means for pressing the tape against said transducer head and said capstan when said closure means are moved into a position to close said opening.

11. The combination defined in claim 1 wherein the tape recorder is movable between "normal forward," "fast forward" and "fast rewind" positions, wherein the tape recorder includes a drive, and wherein said closure means are arranged to serve as the control organ for said drive and for switching the tape recorder between said positions thereof.

12. The combination defined in claim 11 wherein said tape recorder includes an "on"-"off" switch for energizing said drive, and wherein said closure means coact with said switch for closing the same when said closure means closes said frontal opening of said housing.

13. The combination defined in claim 12 wherein said switch is biassed to its "off" position, and said closure means, when closing said frontal opening, holds said switch in "on" position against the force biassing the switch to its "off" position.

14. The combination defined in claim 11 wherein said closure means comprise a flap which is mounted for pivotal movement about a pivot axis extending along said opening, and wherein said flap is slidable in the direction of said pivot axis between three longitudinal positions, the center one of which corresponds to said "normal forward" position of the tape recorder, and the two end positions of which correspond, respectively, to said "fast forward" and "fast rewind" positions of the tape recorder.

15. The combination defined in claim 14 wherein said turntable means include two separate spaced-apart turntables for rotating a take-up reel and a pay-off reel, respectively; wherein said guide means are arranged to receive two tape reels each being positioned in an end position, by said positioning means, to be in alignment with a respective one of said turntables; wherein the tape recorder further comprises a transducer head and a tape driving capstan, said transducer head and said capstan being arranged along said frontal opening of said housing and between said turntables, in consequence of which a tape which is threaded onto two reels inserted through said opening and to be placed into engagement with said turntables is made to lie against said transducer head and said capstan; and wherein said flap carries means for pressing the tape against said transducer head and said capstan when said flap is pivoted about its pivot axis into a position in which said flap closes said opening.

16. The combination defined in claim 15, further comprising camming means coacting with said flap for moving the same away from said transducer head and said capstan when said flap is moved to either of its two end positions, thereby to raise said means which press the tape against said transducer head and said capstan during "fast forward" and "fast rewind" operation.

17. The combination defined in claim 1 wherein the tape recorder further comprises a record switch arranged in said housing, said switch being actuatable when said closure means are open but being held in actuated position only when said closure means are closed.

References Cited by the Examiner

UNITED STATES PATENTS

| | | | |
|---|---|---|---|
| 2,969,929 | 1/1961 | Rudzitis | 242—55.13 |
| 3,167,267 | 1/1965 | Crane | 242—55.13 |

FOREIGN PATENTS

| | | |
|---|---|---|
| 908,254 | 10/1962 | Great Britain. |

STANLEY N. GILREATH, *Primary Examiner.*

G. F. MAUTZ, *Assistant Examiner.*